Fig. 2

INVENTOR.
William Ruddock
BY
Attorney

April 23, 1946. W. RUDDOCK 2,398,859
MATERIAL HANDLING AND LOADING APPARATUS
Filed Jan. 20, 1943 3 Sheets-Sheet 3

INVENTOR.
William Ruddock
BY
Attorney

Patented Apr. 23, 1946

2,398,859

UNITED STATES PATENT OFFICE 2,398,859

MATERIAL HANDLING AND LOADING APPARATUS

William Ruddock, South Pasadena, Calif., assignor of one-half to Marion P. McCaffrey, Los Angeles, Calif.

Application January 20, 1943, Serial No. 472,977

22 Claims. (Cl. 214—148)

This invention relates to material handling equipment. More particularly it relates to such equipment for mounting on a powered vehicle, such as a tractor, and of that type wherein the load receiving member or bucket is supported on the tractor frame to swing upwardly and over the tractor from loading position in front of the tractor to dumping position behind the tractor.

It is an object of this invention to provide such equipment having an improved mode of operation.

It is another object of this invention to provide such equipment, wherein the control is simplified, and the speed of operation materially increased.

It is another object of this invention to provide such equipment wherein the need for reversing mechanism to return the bucket to loading position is obviated.

It is a further object of this invention to provide such apparatus in which the energy generated by the descent of the loaded bucket into unloading position is stored and utilized for returning the bucket to loading position.

It is a still further object of this invention to provide an arrangement whereby the travel of the load receiving member or bucket relative to the tractor as the bucket is moved between loading and unloading position is substantially increased for a given length of the arm on which the bucket is supported.

It is still another object of this invention to provide a support for the bucket arm, which will maintain the bucket elevated when in dumping position, at the same time permitting substantially the maximum travel of the bucket.

It is still another object of this invention to provide a single line controlled bucket for such apparatus.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings.

Figures 1, 10:
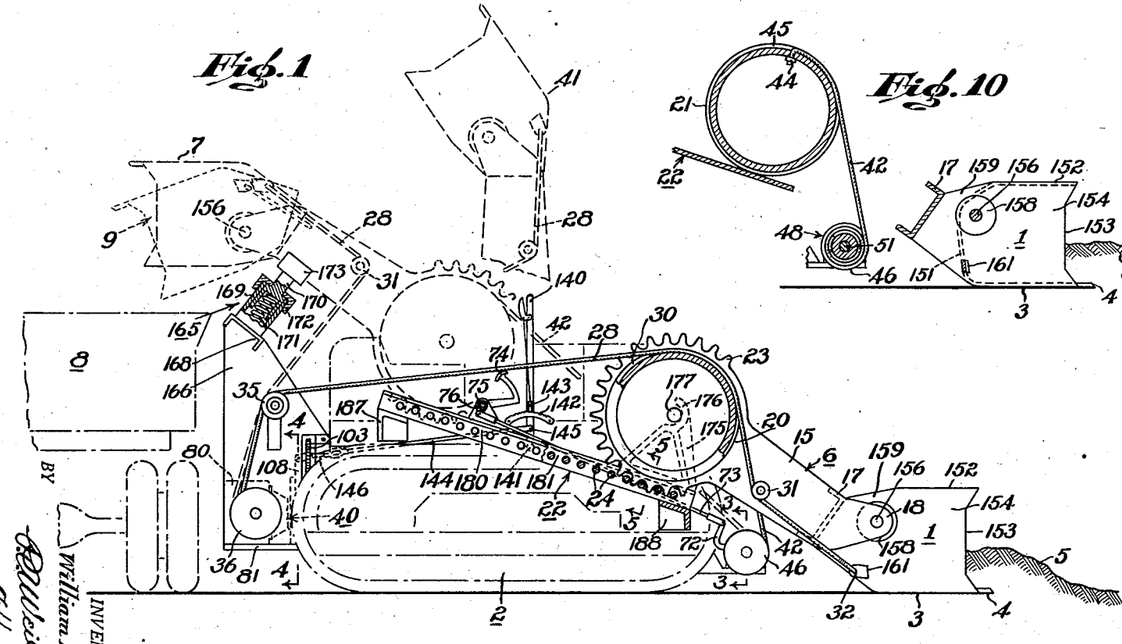
Figure 1 is a side elevation illustrating the improved material handling apparatus mounted on a conventional caterpillar tractor, which is shown in broken lines; alternative operating positions of the material handling apparatus being indicated in dot and dash lines.
Figure 10 is a fragmentary section taken on line 10—10 of Figure 2.

Referring to Figure 1 of the drawings, the material engaging element or bucket is indicated by 1, and is shown by full lines as in digging position, that is, lowered in advance of the tractor 2 and with the bottom 3 of the bucket in a generally horizontal position. The bucket 1 is provided with an advancing cutting edge and teeth 4 which engages the material 5 which is to be handled.

The tractor is caused to advance to the right, forcing the bucket into the material 5. When the bucket has been loaded with an appropriate quantity of the material 5, the bucket 1 together with its supporting arm structure 6 is swung counterclockwise by mechanism to be presently described, so that the bucket passes upwardly and over the tractor 2 as well as over the tractor operator, and then downwardly to a position as indicated by 7, above a suitable receptacle such as a truck body 8 for receiving the material. After the bucket 1 is in this position, it is caused to discharge its load by appropriate manipulation of the control mechanism.

In equipment of this character, it has been common to pivotally support the arm assembly 6 on the tractor 2 for the described swinging movement. In such an arrangement in order to provide a suitable distance between loading and unloading position of the bucket 1, the arm supporting the bucket must be relatively long. This results in an unfavorable leverage condition for raising the loaded bucket as well as requiring considerable overhead clearance to permit the passage of the arm and bucket through the vertical position. The need of maintaining the bucket considerably elevated for unloading also reduces the effective length of such a pivotally mounted arm. By the instant construction, these disadvantages are greatly mitigated.

Figure 2:
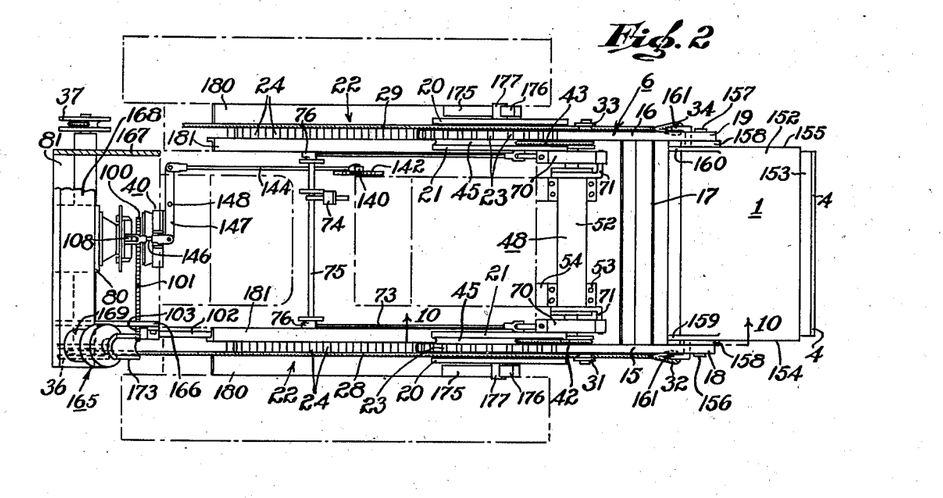
Figure 2 is a plan view of the structure of Figure 1.

By referring to Figures 1 and 2 it will be seen that the arm structure 6 is of U-shaped configuration, comprising a pair of substantially identical side arm members 15 and 16 joined by a transverse member 17 near their outer ends 18 and 19. These outer ends 18 and 19 provide a support for the bucket 1 as will be presently described.

Since these arms 15, 16 are substantially identical, a description for one suffices for both. Thus, the end of the arm opposite to that carrying the bucket is provided with a pair of coaxial cylindrical surfaces 20 and 21 (see also Fig. 5) which are supported on a track 22; appropriately mounted on the frame of the tractor 2. It will be apparent that application of a suitable force to the arm assembly 6 will cause the assembly to move angularly about the center of cylindrical surfaces 20 and 21, the same movement also rotating these surfaces, causing them to have a rolling motion on the supporting track 22. Thus, the entire arm assembly moves along the track and has a translatory motion as well as a swinging motion with respect thereto.

To insure that such translatory motion is always the same for equal angular movements of the arms 15, 16, a series of gear teeth 23 is provided between the cylindrical surfaces 20 and 21. These gear teeth cooperate with spaced pins 24 provided in the track 22, in the manner of a pinion and rack.

Thus, it will be apparent that as the arm 6 swings the bucket from loading to unloading position, it also moves toward the rear of the tractor, so that a shorter arm suffices. Further, by inclining the track upwardly toward the rear of the tractor, the bucket is caused to occupy an elevated position particularly suitable for unloading.

Force imparting this combined swinging and translatory motion to the arm assembly 6 is applied by means of cables 28 and 29. The cable 28 extends forwardly of the tractor 2, over the cylindrical surface 20 where it is accommodated in a suitable groove 30, thence downwardly and under a sheave 31 rotatably mounted on the arm 15, to a point of attachment 32 on the bucket 1. Lifting force is applied to the arm 15 by the cable 28 through the sheave 31 and for the present it may be considered that the cable 28 terminates and is secured to the arm 15 at this point. The cable 29 similarly passes under a sheave 33 on the arm 16 and is secured to the bucket 1 at 34; it may be considered as attached to the arm at 33.

The cable 28 is lead to the rear of the tractor 2 over an idler 35, and thence is wound on a drum 36. The cable 29 similarly passes over an idler (not shown) and is wound on a drum 37. Mechanism generally indicated by 40 is provided to rotate the drums 36 and 37 as well as to check their rotation, and will be presently described.

It will be readily apparent that rotation of the drums 36, 37 in a counterclockwise direction will impart a lifting and rotational force to the arm assembly 6 by means of the cables 28 and 29. This force serves to raise the bucket 1 as well as to cause the entire arm and bucket assembly to travel upwardly along the track 22 due to the rolling action of the wheel structures 20, 21, 23 on the track.

At some point in this travel approximating a position where the arm 6 is vertical, as 41 in Figure 1, the weight of the bucket 1 together with that of any material therein as well as the weight of the arm 6 will pass the dead center or point of equilibrium, and this combined weight will become effective to urge the arm, bucket etc., to continue rotating in a counterclockwise direction, as well as to travel to the rear of the tractor 2 along the track 22. Thus, cables 28 and 29 lose control of the arm assembly 6 and are no longer able to influence its movement.

Obviously, means must be provided to control such downward movement of this weight, as well as to return the arm and bucket to loading position. For this purpose, a second pair of cables 42 and 43 are attached respectively to the arms 15 and 16 as by being secured as at 44 to the cylindrical surfaces 21 thereon. A suitable guiding and clearance groove 45 is provided in each surface 21 for the cable (see Figures 2, 5 and 10). The cables 42, 43 extend in the opposite direction to that of the cables 28 and 29, or toward the front of the tractor, and are respectively wound on drums 46 and 47 (Figure 3), means 48 being provided for controlling the rotation of said drums.

It will be clear that movement of the arm 6 in a counterclockwise direction to move the bucket 1 from loading to unloading position will exert a pull on the cables 42 and 43 causing the drums 46, 47 to rotate in a counterclockwise direction. Thus, after the arm 6 passes the dead center position 41, the descent of the arm to bucket unloading position may be controlled by retarding the rotation of the drums 46 and 47. Further, to swing the arm 6 in a clockwise direction to return the bucket 1 to loading position, the drums 46 and 47 must be caused to rotate in a counterclockwise direction so that the cables 42 and 43 will exert a lifting force on the arm 6 when it is in bucket unloading position. This force causes the arm 6 to swing upwardly, exerting a pull on the cables 28 and 29 and rotating the drums 36 and 37 in a clockwise direction. After the arm 6 has passed the dead center position 41, the weight of the arm and the bucket will cause it to continue to move toward loading position, such movement being regulated by the control means 40.

The energy created by the arm 6 and bucket 1 when loaded and descending from dead center to unloading position will be much greater than the energy required to return the arm 6 and bucket 1 unloaded from such unloading position to the dead center. Hence, by the provision of appropriate means, this energy created by the loaded bucket may be stored and utilized to lift the unloaded bucket. This reduces the amount of mechanism required for lifting the bucket, since no reversing gearing is required for applying force in opposite directions, and the operation is greatly simplified.

Figure 3:
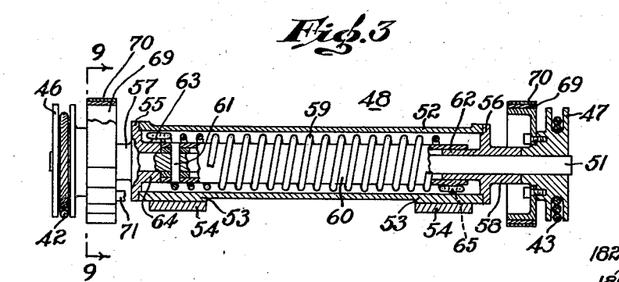
Figures 3, 4 and 5 are detail sections taken on the correspondingly numbered section lines of Figure 1.
Figure 9:
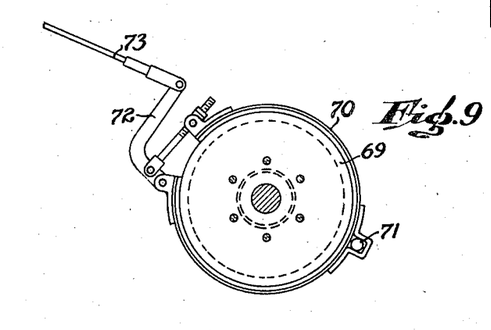
Figure 9 is a detail section taken on line 9—9 of Figure 3.

The means 48 for controlling the rotation of the drums 46 and 47 will now be described, see Figures 2, 3 and 9. As shown in Figure 3, the drums 46 and 47 are fixed on a shaft 51 in any appropriate manner, and adjacent its respective ends, the shaft 51 extends axially through a tubular housing 52 which is supported on the frame of the tractor 2, as by means of integral pads 53 secured to extensions 54 of the frame. The ends of housing 52 are respectively closed by heads 55 and 56, suitably secured to the housing. The heads 55 and 56 have respectively hubs 57 and 58 which support the shaft 51 for rotation with respect to the housing 52.

A torsion spring 59 is enclosed in the housing 52, one end of the spring being secured against rotation, and the other end being fixed to rotate with the shaft. The arrangement is such that counterclockwise rotation of the drums 46 and 47, referring to Figure 1, will wind the spring to increase its tension. Thus, movement of the arm 6 in a counterclockwise direction is always opposed by the force of the spring 59, or stated another way, the spring 59 urges the arm 6 in a clockwise direction at all times.

A sleeve 60 is axially fixed as well as angularly fixed on the shaft 51 by means of a through pin 61 at one end of the sleeve. The opposite end of sleeve 60 is rotatably supported by an inwardly extending hub 62 formed on the head 56. The spring 59 is supported on the exterior of the sleeve 60. One end of the spring 59 is secured against movement relative to the housing 52 as by engagement with a lug 63 formed on an inwardly extending hub 64 of the head 55. The other end of the spring 59 is fastened to a lug 65 on the sleeve 60, so as to rotate with the sleeve.

Means are provided for controlling the rotation of the shaft 51 together with the drums 46 and 47, such rotation being either in response to the force of the spring 59, or to the weight of the arm 6. This means may comprise any suitable brake arrangement. As shown, brake drums 69 are secured on the shaft 51 adjacent the drums 46 and 47 and are adapted to be engaged by resilient rake bands 70 (Figure 9), which act in a conventional manner. Thus, each band 70 is anchored against rotating with its associated drum 69 by suitable engagement with an arm 71 formed on the adjacent head 55 or 56. Each band 70 is contracted into engagement with its cooperating drum 69 by swinging of a crank arm 72 to the left in response to a pull on the brake rod 73. When the pull on rod 73 is released, the natural resilience of band 70 causes it to expand out of engagement with the drum 69. Bands 70 are of course provided with suitable brake lining.

The brake bands 70 are caused to simultaneously engage the respective drums 69 by means of pressure on the foot pedal 74, positioned for convenient actuation by the operator. The pedal 74 is mounted on a suitably supported rock shaft 75, which extends across the tractor 2 and has a lever arm 76 at each end suitably coupled to the brake rod 73.

The mechanism 40 for controlling the operation of the drums 36 and 37 will now be described. To insure equal tension in the cables 28 and 29 without the need of careful initial adjustment, as well as to guard the supporting structure from severe strains due to unequal distribution of the load in the bucket 1, or of shocks to the bucket incident to loading, equalizing means is provided as between the drums 36 and 37. This equalizing means may conveniently be in the form of a differential mechanism through which power for controlling the rotation of the drums 36 and 37 is simultaneously applied to the drums, and closely resembling the conventional rear axle mechanism of an automobile.

Figure 4:
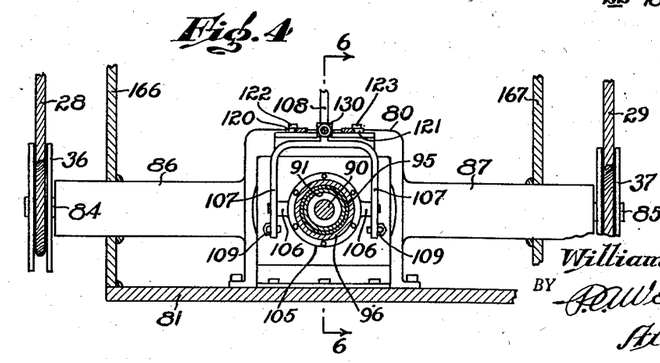
Figure 6:
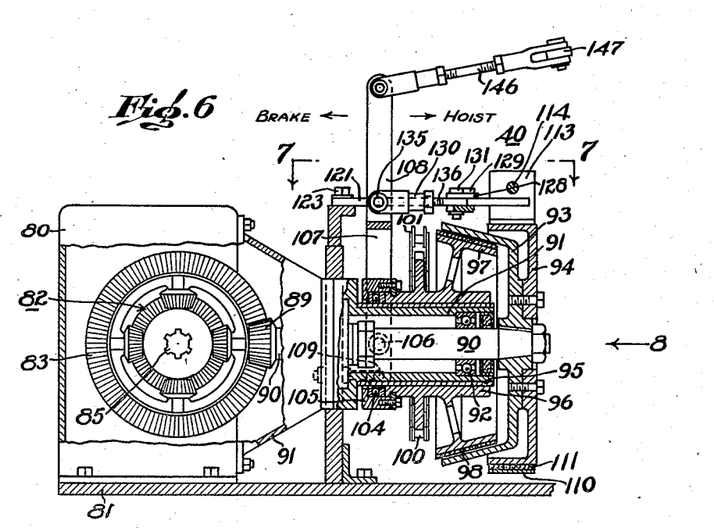
Figure 6 is a sectional view to an enlarged scale taken on line 6—6 of Figure 4.

Thus, a gear housing 80 is appropriately mounted on the rear of the tractor 2, as by being supported on an extension 81 of the tractor frame (see Figures 4 and 6). Within the housing 80 the differential mechanism 82 is rotatably supported and carries the ring gear 83 by which it is driven. A pair of shafts 84 and 85 extend in opposite directions from the differential 82 and are arranged to be driven thereby. These shafts 84 and 85 are accommodated in tubular extensions 86 and 87 respectively of the housing 80. The drums 36 and 37 are secured respectively to the shafts 84 and 85 adjacent their outer ends. Upon the application of either a driving force or a holding force to the ring gear 83, the differential 82 permits relative rotation between the shafts 84 and 85 until the force transferred to them is equal. This is all well understood.

A bevel pinion 89 meshes with the ring gear 83 to control the rotation of the ring gear and hence of differential 82 (see Figure 6). The pinion 89 is shown as formed integrally on one end of a shaft 90, rotatably supported in a forward extension 91 of the housing 90 by suitable anti-friction bearings, one of which is shown at 92. Secured on the shaft 90 so as to rotate therewith, and adjacent the end opposite to that carrying the pinion 89 is a clutch shell 93 and a brake drum 94. The housing extension 91 has a cylindrical portion 95 which supports a sleeve 96 on its exterior, sleeve 96 being rotatable as well as axially movable on the portion 95. The sleeve 96 has a clutch spider 97 formed thereon for cooperation with the clutch shell 93. The clutch spider 97 and the shell 93 together form a conventional cone clutch. The spider 97 may have a suitable facing as indicated at 98.

The sleeve 96 also has a sprocket 100 formed integrally therewith and connected by a roller chain 101 with a suitable source of power. This source of power may conveniently be the motor which drives the tractor. For this purpose a longitudinally extending shaft 102 (Figure 2), arranged to be driven by the motor, is rotatably supported at one side of the tractor, and extends to the rear of the tractor where it carries a sprocket 103 over which the chain 101 passes.

When the tractor motor is operating, the shaft 102 and sprockets 103 and 100, together with the sleeve 96 and clutch spider 97 will all be rotating. The ring gear 83 may or may not then be driven by the pinion 89, depending on whether the clutch members 97 and 93 are engaged or not.

As a means of urging the clutch members into engagement, an anti-friction thrust bearing 104 is secured to the rear end of the sleeve 96 by means of a suitable cage 105. The cage 105 has a pair of diametrically extending pins 106 engaged by the lower ends 107 of a shift lever 108. This lever 108 is pivotally supported at 109, so that when the upper end is swung to the right, the clutch spider 97 is urged into engagement with the shell 93. Obviously, movement of the lever 108 in the opposite direction will disengage the spider 97 from the shell 93.

Figure 7:
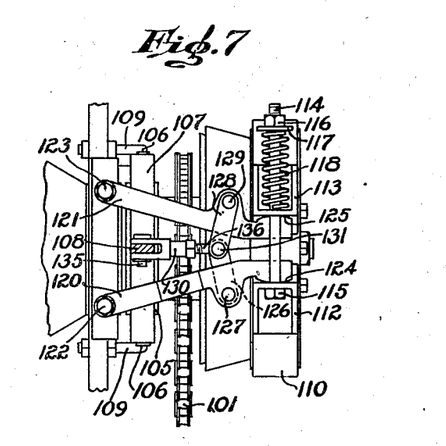
Figure 7 is a section taken on line 7—7 of Figure 6.
Figure 8:
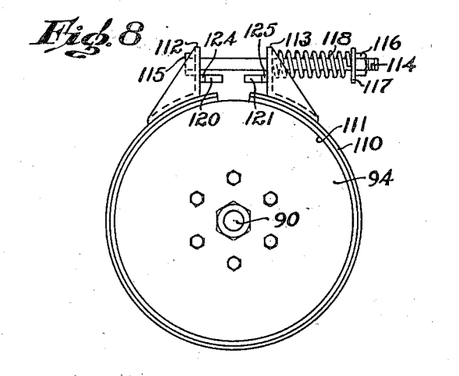
Figure 8 is an elevation of the structure of Figure 6 as viewed from the right.

Brake means are also necessary for controlling the pinion 89 and hence the ring gear 83. Thus, (see particularly Figures 7 and 8) a resilient band 110 having an appropriate lining 111 is provided and encircles the drum 94. Ears 112 and 113 are secured to the band 110 adjacent its ends. A bolt 114 passes through clearance holes in the ears 112 and 113 and has a head 115 which engages one of the ears as 112. The other end of the bolt 114 has a nut 116 threaded thereon serving to position a washer 117, between which and the other ear 113, is confined a compression spring 118. The arrangement is such that the spring 118 always urges the brake band 110 into engagement with the drum 94, the force of such engagement being adjustable by altering the position of the nut 116 to vary the pressure of spring 118.

To disengage the band 110 from the drum 94 it is necessary to apply force urging the ears 112 and 113 apart against the force of the spring 118. Levers 120 and 121 are provided for this purpose.

These levers are respectively pivotally mounted at 122 and 123 and have arcuate surfaces 124 and 125 respectively engaging the opposed faces of the ears 112 and 113. A short link 126 is piovted to the lever 120 at 127, and a similar link 128 is pivoted to the lever 121 at 129. These links 126 and 128 are pivotally connected to each other and to a push rod 130 at 131, forming a toggle joint. When the push rod 130 is urged to the right, the links 126 and 128 lie more nearly in a straight line, forcing the levers 120 and 121 apart and releasing the brake. When the push rod 130 is moved to the left, the levers 120 and 121 are pulled together, allowing the spring 118 to urge band 110 into braking position.

Since the brake is never applied when the clutch is engaged and vice versa, it is possible to utilize the lever 108 for controlling both the clutch and the brake. Thus, the push rod 130 is pivotally connected to the lever 108 at 135. It is preferable that there be some position of the lever 108 at which neither the clutch nor the brake are engaged, and this may be arranged by appropriate adjustment of the parts. For this purpose the push rod 130 includes means 136 forming a threaded connection intermediate the ends of the push rod. Thus, when the lever 108 is urged to the right (Figure 6) the clutch members 93 and 97 are engaged, brake members 94 and 110 are released, and the ring gear 83 and connected parts are driven by the tractor motor. When the lever 108 is urged in the opposite direction, toward the left, the brake is applied and the clutch is released. At some intermediate position of the lever 108, the clutch and brake are both disengaged.

To provide for convenient actuation of the lever 108 by the operator of the machine, a control lever 140 is mounted on the tractor adjacent the operator's seat (see Figures 1 and 2). This lever 140 is pivotally secured to the tractor frame or other convenient part at 141 and is provided with a conventional quadrant and latch mechanism 142 and 143 for holding it in adjusted position. The lever 140 is operatively connected to the lever 108 by means of a link 144 pivoted to the lever 140 at 145, and an adjustable link 146 pivoted to the lever 108, and an intermediate lever 147 pivotally supported on the tractor at 148, links 144 and 146 being pivotally connected respectively to the opposite ends of the lever 147. It will be plain that by appropriate manipulation of the control lever 140, the brake 110—94 may be applied or released, or the clutch 93—97 engaged or released as necessary to the operation of the machine, and that the latch mechanism 142—143 enables such adjustment to be maintained as desired without attention on the part of the operator.

The bucket 1 is of novel form which simplifies the means for controlling the dumping of the load as well as simplifying the operation of the machine. In this connection attention is invited to Figures 1, 2 and 10. By referring to Figure 10, it will be seen that the bottom 3 of the bucket 1 is continued upwardly to form the back 151 and over to form a top 152. Thus, the bucket is only open in front for receiving the load, as at 153. The side plates 154 and 155 of the bucket carry pins 156 and 157 for respectively engaging the ends 18 and 19 of the supporting arms 15 and 16. Appropriate reenforcing plates 158 may be provided about these pins 156 and 157.

The pins 156 and 157 are so positioned on the sides of the bucket 1 when the arm 6 is in the forward or bucket loading position that the weight of the bucket either empty or loaded tends to rotate the bucket in a clockwise direction, referring to Figures 1 and 10. To limit such rotation, the side plates 154 and 155 have rearward extensions 159 and 160 (Figures 2 and 10) adapted to seat against the member 17 and maintain the bucket 1 in the position relative to the arm 6 shown in Figures 1 and 10. However, the bucket 1 may be caused to rotate in the opposite direction as will presently appear.

As previously pointed out, the cables 28 and 29 are secured to the opposite sides of the bucket 1 at the points 32 and 34, suitable attachment ears 161 being secured on the bucket sides. These ears 161 are below the pins 156 and 157 (Figure 1), hence a pull on the cables 28 and 29 urges the bucket to rotate clockwise until stopped by the seating of extensions 159 and 160 as just described. After such seating has occurred, the cables are in effect anchored to the arm 6 as far as the cables are concerned, so that further pull on the cables exerts a lifting rotative effect on the arm assembly 6 at sheaves 31 and 33, as previously pointed out.

When the arm assembly 6 and bucket 1 have been lifted past the dead center position, as 41 of Figure 1, their weight causes them to tend to fall whereby control over them by the cables 28 and 29 is lost. However, this tendency is checked by the previously described action of the spring 59 and brake mechanisms 69, 70, which force is applied to the arm 6 by the cables 42, 43, serving optionally to control or to entirely check such movement. At the same time sufficient tension must be maintained in the cables 28 and 29 to hold the bucket 1 against rotation about the pivots 156 and 157, to prevent dumping of the load.

When the bucket 1 has reached the desired unloading position such as indicated by 7, Figure 1, further movement of the arm 6 is checked by means of brake mechanisms 69, 70, and the tension in the cables 28 and 29 is released. Since the center of gravity of the bucket 1 and its load is now to the left of the pivots 156 and 157, the bucket turns counterclockwise to the position indicated by 9, Figure 1, and discharges its load.

To simplify the operation of the machine, as well as to guard it against damage due to carelessness of the operator, stop means 165 are provided for preventing movement of the arm 6 beyond the point where the bucket 1 is properly positioned for unloading.

A pair of vertical members 166 and 167 which may be steel plate, are secured to the rear extension 81 of the tractor frame adjacent the edges of the extension. A cross member 168 which may be a channel iron extends between and beyond these vertical members. Secured to the cross member 168 and in the plane of each of the arms 15 and 16 is a cylinder 169. Slidable within the cylinder 169 is a plunger 170. The plunger 170 is urged outwardly of the cylinder 169 by a compression spring 171 housed in the cylinder, a cap 172 threaded on the outer end of the cylinder serving to prevent the plunger 170 being pushed out of the cylinder by the spring. The upper end of the plunger 170 carries a saddle 173 for receiving the arm 15. An identical structure is mounted at the opposite end of the cross member 168 for receiving the arm 16. It will be apparent that when the arm assembly 6 reaches bucket unloading position the arms 15 and 16 will seat in their respective saddles 173, whereby further downward movement of the arm assembly will be resiliently checked.

For checking the movement of the arm 6 when the bucket has returned to loading position, A-shaped stop members 175 are secured to each track 22 near its lower end. Each member 175 has an arcuate upper extension 176 adapted to be engaged by a stub shaft 177, formed on arm 15 or 16, as the case may be and concentric with the roller structure, 20, 21, 23.

The operation of the machine may now be set forth. With the bucket 1 in the full line position of Figure 1, the tractor is caused to move forward or toward the right as viewed in that figure until a desired quantity of the material 5 is forced into the bucket 1. The operator then pulls the control lever 140 toward the left, Figure 1, causing the clutch members 93, 97 to engage, thus driving the drums 36 and 37 counterclockwise. This exerts a pull on the cables 28 and 29 which is first effective to swing the bucket 1 clockwise into seating position against the member 17, in case it does not already happen to be in such a position. Thereafter, this pull acts to raise the arm assembly 6 and the loaded bucket in a counterclockwise direction to approximately a vertical position, as previously explained.

As the arm assembly and the bucket pass the dead center position, their weight together with that of the load in the bucket, urges the arm and the bucket downwardly. This downward motion is controlled by applying the brakes 69, 70 by foot pressure on the pedal 74, and must be so restricted as to insure some tension remaining in the cables 28, 29, by virtue of the positive rotation of the drums 36 and 37 for maintaining the bucket 1 in seated or load retaining position.

When the bucket 1 reaches the position where it is desired to dump the load, downward motion of arm 6 is stopped, either by sufficient braking force exerted by means of the pedal 74, or by allowing the side arms 15 and 16 to rest in their stops 165. Coincidently with this stoppage of the arm 6, the operator shifts the control lever 140 toward the right to neutral position, disengaging the clutch members 93, 97 and allowing free movement of the cables 28 and 29. The bucket 1 thus swings downwardly to load dumping position as indicated by 9 in Figure 1, the drums 36 and 37 revolving clockwise.

In event there is difficulty in discharging the bucket's load, the downward swing of the bucket about its pivots may be abruptly halted by vigorous application of the brake 94, 110 in response to movement of the control lever 140 to the right from neutral position. In fact, a series of jerks may be imparted to the bucket 1 by appropriate successive operations of the clutch and brake mechanism.

As previously mentioned, movement of the arm assembly 6 toward load dumping position causes the cables 42 and 43 to unwind from their respective drums 46 and 47, thus winding the torsion spring 59 to increase the tension therein. This force acts continuously to urge the arm assembly to the right, the parts being so proportioned that the force is sufficient to readily swing the arm and bucket upwardly from unloading position when the bucket is empty. Either the brake mechanism operated by the pedal 74 or that operated by the control lever 140 may be used to restrain the arm from such upward movement.

Upon release of these brakes, the arm 6 and the empty bucket 1 swing clockwise in response to the force of the spring 59. As the arm 6 passes dead center, the weight of the arm 6 etc., tends to accelerate this movement, which movement however may be controlled by applying brake 94, 110 by means of the lever 140. From the foregoing, it will be clear that no power reversing mechanism is needed for returning the arm 6, which renders the operation of the machine simple and rapid.

From an inspection of Figures 1 and 2, it will be plain that the greatest force to swing the arm assembly 6 is required when the arm is in either of its extreme positions. Also, that the cables exerting such force are in their most extended positions. Thus, by providing drums for said cables wherein successive lays are spooled radially of the drums instead of laterally, it is possible to have the forces exerted by the cables automatically varied in an appropriate manner.

Thus, with the arm 6 in bucket loading position, the working portions of the cables 28 and 29 are substantially all unwound from their drums 36 and 37, so that when it is desired to raise the arm 6, the drums 36 and 37 are able to exert their most effective leverage on the cables, this leverage decreasing as the cables wind on the drums as the arm 6 moves counterclockwise. Conversely, with the arm in loading position the working portions of the cables 42 and 43 are substantially all wound on the drums 46 and 47, and unwind as the arm 6 swings to unloading position. Hence, when these drums are required to lift the arm 6 clockwise, their leverage conditions are most favorable.

Another advantage of this type of winding drum is the absence of lateral movement of the cables as they are wound on or unwound from the drums. This prevents lateral strains when the cables pass to sheaves or points of attachment which are close to the drums.

Figure 5:
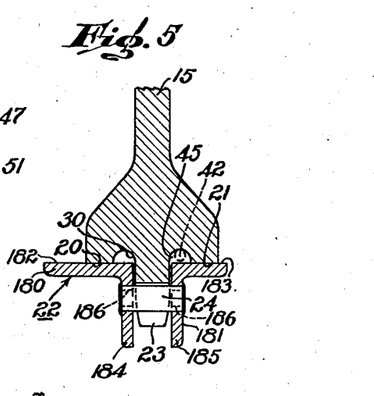

The track 22 as shown in Figure 5 is of novel form. It includes angle bars 180 and 181 positioned with their upper faces 182 and 183 aligned for supporting the rolling surfaces 20 and 21. Their vertical legs 184 and 185 are spaced apart to accommodate gear teeth 23, and are joined by pins 24, some of which may be shouldered as indicated at 186 for spacing the angle bars. The track 22 may be supported on the frame of the tractor 2 by the brackets 187, 188.

I claim:

1. In material handling equipment, a bucket for receiving the material to be handled, an arm on which the bucket is mounted, said bucket being movable with respect to said arm between material retaining and material discharging positions, means supporting said arm for movement so that the bucket may be lifted from a position on one side of the supporting means to a position on the opposite side thereof, said movement causing the arm to pass a dead center position, means for applying force to the bucket to maintain the bucket in material retaining position, means whereby said force also acts to raise said arm to and past said dead center position, means for controlling the movement of said arm after it passes the dead center position, and means for relaxing the force applied to the bucket, so that the bucket may be moved to load discharging position.

2. In material handling apparatus, a material engaging element, an arm on which said element is mounted, means supporting said arm for movement to move said element between load receiving position and load discharging position, said movement causing the arm to pass from a position on one side of a vertical dead center position to a position on the other side of said dead center, means for applying force to the arm to move it to and past said dead center position, and optionally operable means for applying a restraining force to said arm independently of said force applying means.

3. In material handling apparatus, a material receiving bucket, an arm to which the bucket is movably attached, said bucket being movable between a material retaining position and a material dumping position with respect to said arm, means supporting said arm for movement to raise and lower the bucket, said movement causing the arm to pass to and through a vertical dead center position, means for applying a force to said bucket, means whereby said force maintains said bucket in material retaining position relative to said arm and causes said arm to move about its support, additional means for controlling the arm, and means for relaxing said force to permit the bucket to move on the arm to dumping position.

4. In material handling apparatus, a material receiving bucket, an arm to which the bucket is movably attached, said bucket being movable between a material retaining position and a material dumping position with respect to said arm, means supporting said arm for movement to raise and lower the bucket, said movement causing the arm to pass to and through a vertical dead center position, means for applying a force to said bucket, means whereby said force maintains said bucket in material retaining position relative to said arm and causes said arm to move about its support, means for relaxing said force to permit the bucket to move on the arm to dumping position, and means optionally applying resilient force to the arm opposing said force applying means, said resilient force being adapted to swing the arm in the opposite direction upon relaxation of the first force.

5. In material handling apparatus, a material engaging element, an arm on which said element is mounted, means supporting said arm for movement to raise and lower said element, said movement causing the arm to pass from a position on one side of a vertical dead center position to a position on the other side of the dead center, means for optionally applying force to move the arm in either direction from the vertical, and independently operable brake means for respectively controlling the movement of the arm.

6. In material handling apparatus, a material receiving element, an arm on which said element is mounted, means supporting said arm for movement to raise and lower said element, said movement causing the arm to pass from a position on one side of a vertical dead center position to a position on the other side of the dead center, means for optionally applying a force to raise the arm and swing it to a position past the dead center with said element loaded, means for storing the energy created by the loaded arm moving downwardly from said position, and means for optionally controlling the dumping of the load, whereby the stored energy is effective to swing the arm together with the unloaded element in the opposite direction.

7. In material handling apparatus, a load receiving bucket, an arm to which the bucket is movably attached, said bucket being movable between a load retaining position and a load dumping position with respect to said arm, means supporting said arm for movement to raise and lower the bucket, said movement causing the arm to pass to and through a vertical dead center position, means for applying a force to said bucket, means whereby said force maintains said bucket in load retaining position relative to said arm, and causes said arm to move about its support to and through said dead center position, means for storing the energy created by the downward movement of the arm and load from said position, and means for relaxing the force acting on said bucket to permit the bucket to move to load dumping position relative to the arm, whereby said stored force is adapted to swing the arm and bucket in the opposite direction.

8. In material handling apparatus, a load receiving bucket, an arm to which the bucket is movably attached, said bucket being movable between a load retaining position and a load dumping position with respect to said arm, means supporting said arm for movement to raise and lower the bucket, said movement causing the arm to pass to and through a vertical dead center position, means for applying a force to said bucket, means whereby said force maintains said bucket in load retaining position relative to said arm, and causes said arm to move about its support to and through said dead center position, means for storing the energy created by the downward movement of the arm and load from said position, means for relaxing the force acting on said bucket to permit the bucket to move to load dumping position relative to the arm, whereby said stored force is adapted to swing the arm and bucket in the opposite direction, and brake mechanism for controlling the action of said stored force on the arm.

9. In material handling apparatus, a load receiving bucket, an arm to which the bucket is movably attached, said bucket being movable between a load retaining position and a load dumping position with respect to said arm, means supporting said arm for movement to raise and lower the bucket, said movement causing the arm to pass to and through a vertical dead center position, means for applying a force to said bucket, means whereby said force maintains said bucket in load retaining position relative to said arm, and causes said arm to move about its support to and through said dead center position, means for storing the energy created by the downward movement of the arm and load from said position, means for relaxing the force acting on said bucket to permit the bucket to move to load dumping position relative to the arm, whereby said stored force is adapted to swing the arm and bucket in the opposite direction, and means for controlling the downward movement of the arm on either side of said dead center.

10. In material handling apparatus, a bucket and arm assembly, a support for said arm, comprising means on said arm forming a curved surface and an inclined track on which said surface rolls, the inclination of said track being such as to oppose rolling movement of said surface to position said arm with the bucket in load discharging position, and independent means optionally controlling the movement of said surface in either direction on said track.

11. In material handling apparatus, a bucket and arm assembly, said arm being movable to position said bucket optionally in load receiving or in load dumping position, a support for said arm, comprising means forming a curved surface on said arm and a track on which said surface rolls, the swinging movement imparted to the arm by the rolling of said surface serving to move the bucket from load receiving to load dumping position, said track and said curved surface being so constructed and arranged as to raise the supported end of the arm while the bucket is lowered as the bucket approaches load dumping position, and means optionally controlling the lowering of the bucket.

12. In material handling apparatus, a bucket and arm assembly, a support for said arm, comprising means on said arm forming a circular surface and a track on which said surface rolls, means for controlling the movement of said surface along the track, including a cable acting tangentially on a circular surface on the arm for any position of said surface during such movement, said circular surfaces being coaxial, and force exerting means acting on said cable.

13. In material handling apparatus, a bucket and arm assembly, said arm being movable to position said bucket optionally in load receiving or in load dumping position, a support for said arm, comprising means forming a curved surface on said arm and a track on which said surface rolls, the swinging movement imparted to the arm by the rolling of said surface serving to move the bucket from load receiving to load dumping position, said track being inclined to raise the supported end of the arm as the bucket approaches load dumping position, means applying force to said arm to swing it to load dumping position, and to cause said surface to roll up said inclined track, and spring means energized by said movement for continuously urging said arm in the opposite direction.

14. In material handling apparatus, a bucket and arm assembly, a support for said arm, comprising means on the arm forming a curved surface and a track on which said surface rolls, means simultaneously applying a pair of oppositely directed forces to said arm, and independent means controlling said forces, whereby one or the other may be optionally rendered effective to cause said surface to roll on said track in a chosen direction.

15. In material handling apparatus, a bucket and arm assembly, means swingably supporting said assembly for movement to and through a vertical dead center position from either side of said position, means for controlling the swinging of said arm, said means being subjected to a reversal of forces when the assembly passes said dead center, said means comprising independent force applying mechanisms adapted to raise the assembly respectively from either side of the dead center, and brake mechanisms adapted to independently control the lowering of the assembly on either side of the dead center.

16. In material handling apparatus, a bucket and arm assembly, means swingably supporting said assembly for movement to and through a vertical dead center position from either side of said position, means for controlling the swinging of said arm, said means being subjected to a reversal of forces when the assembly passes said dead center, said means comprising force applying mechanisms adapted to raise the assembly from either side of the dead center, brake mechanisms adapted to independently control the lowering of the assembly on either side of the dead center, and means whereby the operation of the brake for controlling the downward movement of the arm on the respective sides of the dead center is correlated with the operation of the means which applies the raising force on the same side.

17. In material handling apparatus, a U-shaped arm assembly comprising a pair of similar side arms connected adjacent their outer ends by a transverse member, the space between said arms being clear, from the transverse member to the inner ends of the arms, a material receiving element supported by said assembly adjacent said member, and means for supporting said arm assembly, said supporting means comprising a curved surface adjacent the inner end of each side arm and means forming a pair of surfaces cooperating with said curved surfaces to permit rolling movement of said arm assembly to raise and lower the material receiving element.

18. In material handling apparatus, a U-shaped arm assembly comprising a pair of similar side arms connected adjacent their outer ends by a transverse member, the space between said arms being clear, from the transverse member to the inner ends of the arms, a material receiving element supported by said assembly adjacent said member, and means for supporting said arm assembly, said supporting means comprising means forming a pair of aligned similarly curved surfaces, respectively adjacent the inner ends of said side arms, and means forming tracks on which said surfaces are adapted to roll, whereby to raise and lower said material receiving element.

19. In material handling apparatus, a material receiving element, an arm assembly on which said element is mounted, means forming a curved surface on said arm, means forming a track on which said curved surface rests, whereby the arm is supported for rolling movement to raise and lower the bucket, said track forming means being inclined, means for applying force to said assembly to cause the assembly to roll up said inclined track, an energy storing device, and means operatively connecting said arm assembly with said device, whereby energy is stored therein in response to said movement of the assembly up the incline, said energy serving to assist the rolling movement of the arm assembly down the inclined track.

20. In material handling apparatus, a material receiving element, an arm assembly on which said element is mounted, means forming a curved surface on said arm, means forming a track on which said curved surface rests, whereby the arm is supported for rolling movement to raise and lower the element, said track forming means being inclined, a source of power, means for optionally applying force from said source of power to said arm assembly to cause it to roll up said inclined track, and resilient means continuously operating to urge said assembly to roll down said track.

21. In material handling apparatus, a material receiving element, an arm assembly on which said element is mounted, means forming an inclined track, means supporting said arm assembly on said track for rolling movement therealong for raising and lowering the material receiving element, the extent of said rolling movement and the inclination of the track being such that as said assembly rolls up said track, said assembly and said element are swung upwardly from a position where the element is adapted to be loaded, to a vertical dead center position and thence downwardly to a position where the element is adapted to discharge its load, power means for urging the arm assembly to roll up said track to a position past said dead center, and means resiliently opposing movement of said arm assembly and said element from said position to the load discharging position, said resilient means being optionally effective to return the arm assembly and said element from the load discharging position to a position past said vertical dead center, the inclination of the track assisting the resilient means.

22. In material handling apparatus, an arm supported for rotational movement, a pair of drums respectively on opposite sides of said arm in the direction of its movement, cable means operatively connecting said arm with said drums so that rotation of both drums and rotary movement of the arm occur simultaneously, said drums being so constructed and arranged that successive wraps of the cable on each drum are at progressively different radii thereon and respectively in opposite directions, whereby the force which may be exerted between the arm and each drum varies in accordance with the position of the arm and in the opposite sense with respect to said drums.

WILLIAM RUDDOCK.